(No Model.)
O. C. DEVEREUX.
Manufacture of Articles of Jewelry.
No. 243,113.          Patented June 21, 1881.
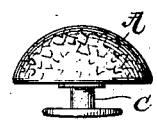
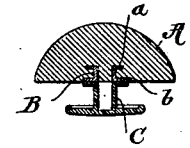
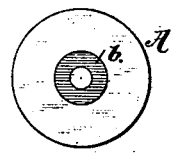
Attest;
Geo. H. Graham
Abraham L. Jacobs
Inventor,
Orin C. Devereux.
By atty. Jacob Felbel

UNITED STATES PATENT OFFICE.

OREN C. DEVEREUX, OF PROVIDENCE, RHODE ISLAND, ASSIGNOR TO JOHN THOMPSON, OF NEW YORK, N. Y.

MANUFACTURE OF ARTICLES OF JEWELRY.

SPECIFICATION forming part of Letters Patent No. 243,113, dated June 21, 1881.

Application filed April 15, 1881. (No model.)

*To all whom it may concern:*

Be it known that I, OREN C. DEVEREUX, of Providence, in the county of Providence and State of Rhode Island, have invented certain new and useful Improvements in the Manufacture of Articles of Jewelry, &c.; and I do hereby declare that the following is a full and exact description thereof, reference being had to the accompanying drawings, making part of this application.

My invention relates to that class of articles of jewelry, dress, and ornamentation which is composed, essentially, of a composition stone, usually of glass or enamel, provided with a metal base or facing that is united by solder to any suitable metallic shank or setting. As is well-known, it is impossible to solder the composition or stone to a metal setting, and hence the necessity to provide said stone with a metallic base or facing to which the metal setting can be soldered.

Previous to my invention various forms of metallic bases have been employed in combination with the artificial stone (to adapt the latter for union by solder to the metallic frame or setting;) but the forms of these devices and the methods of securing them to the stones have been such that in the use of the article, while the solder securely held together the metallic base and the setting, the stone soon became detached from its said base, in which event the article was rendered absolutely useless on account of the impracticability of reuniting the parts, (except by dissolving the compound, which, of course, after refinishing, &c., would be more expensive than to replace the broken article by a new one.)

My invention has for its object to avoid liability of any separation of the stone and its metallic base, and at the same time have the improved article simple, durable, and economic of manufacture.

To this end and object my invention consists in an enamel, a glass, or other composition stone having a molded-in metal base that is formed at its inner end with a flange or equivalent device to interlock with the material in which it is embedded, said metal base and said composition stone being thus combined in a manner to avoid all possibility of their being pulled apart, the said base having its outer end provided with a sufficient amount of stock to enable it to be united by soldering to any suitable metallic shank or setting, all as will be hereinafter more fully described.

To enable those skilled in the art to make and use my invention, I will now proceed to more fully explain the same, referring by letters to the accompanying drawings, making part of this specification, and in which I have illustrated my invention applied to sleeve or cuff buttons.

Figure 1 represents, in elevation, a composition or artificial stone provided with my improvement and attached to a metal shank to form a sleeve-button. Fig. 2 is a vertical section of the same. Fig. 3 is a view of the under side or face of the stone and the molded-in metal base device. Fig. 4 is an enlarged detail view of the said molded-in metallic base device detached.

In the several figures the same part will be found designated by the same letter of reference.

A is an artificial stone, made from any of the known compositions or compounded substances, and B is the preferred form of metal base device for keying or interlocking itself with said stone, and to be soldered at its outer end to the metallic shank or setting C. The base device B, as shown, is a short cylindrical tube with flanged ends $a\ b$, and in practice I insert it into the composition top or stone while the latter is in a soft or plastic state and while lying in the mold and just previous to its being pressed or formed into its final shape or design for the button-top or other article.

During the operation of shaping the composition top by dies or in molds the plastic material is forced within and fills the annular groove formed between the two flanges $a\ b$ of the eyelet-like device B, thus surrounding the body of said device; and, after becoming hardened or set, the composition, of course, confines said device in a secure manner.

Of course it will be understood that, as shown in the drawings and already explained, the eyelet-like device B must be inserted into the disk or stone no farther than the bottom flange, b, and so that said flange shall come about flush with the under side of the stone A, the main purpose of this flange b being to provide the stone with a metallic base surface, by means of which it may be readily and securely soldered onto the metal shank or setting C.

The main function of the inner flange, a, is to lock the metal device B within the stone, and in an article made as shown a separation of the parts cannot be effected except by breaking the stone, since any force tending to pull them asunder would be fully met and sustained by the flange a firmly and snugly interlocked with the stone A. After the stone A shall have been formed and the device B secured therein, as shown and described, the stone with its metallic base is mounted or set on the metal shank C, in the usual manner, by soldering.

Although I have shown my invention as applied to the manufacture of sleeve-buttons only, it will be understood, of course, that I do not wish it to be considered as limited to such articles; neither do I consider it as restricted to the precise and preferred form of device B shown, with flanges a b, as the invention may be practiced without departing from its spirit with other forms of base device, the gist of the invention resting in the idea of providing the stone with a molded-in metal base device for the purpose set forth, and having a device at its inner end adapted to project in a direction about transverse to the direction in which any strain tending to pull them apart would come, and to be embedded within the material of which the stone or button-head is composed.

Having now so fully described my invention, what I claim as new, and desire to secure by Letters Patent, is—

1. An enamel or other composition stone having a molded-in metallic device that is interlocked at its inner end with the material in which it is embedded, and is adapted to be soldered at its outer end to any suitable metallic shank or setting, as described.

2. A glass or other composition stone provided with a molded-in metallic device having both an inner and outer flange, as and for the purposes set forth.

In testimony whereof I have hereunto set my hand and seal this 9th day of April, 1881.

OREN C. DEVEREUX. [L. S.]

In presence of—
HARMON S. BABCOCK,
IRA O. SEAMANS.